Sept. 23, 1969     B. L. AUSTIN     3,468,583
DIAMOND MILLING CUTTERS
Filed June 30, 1967
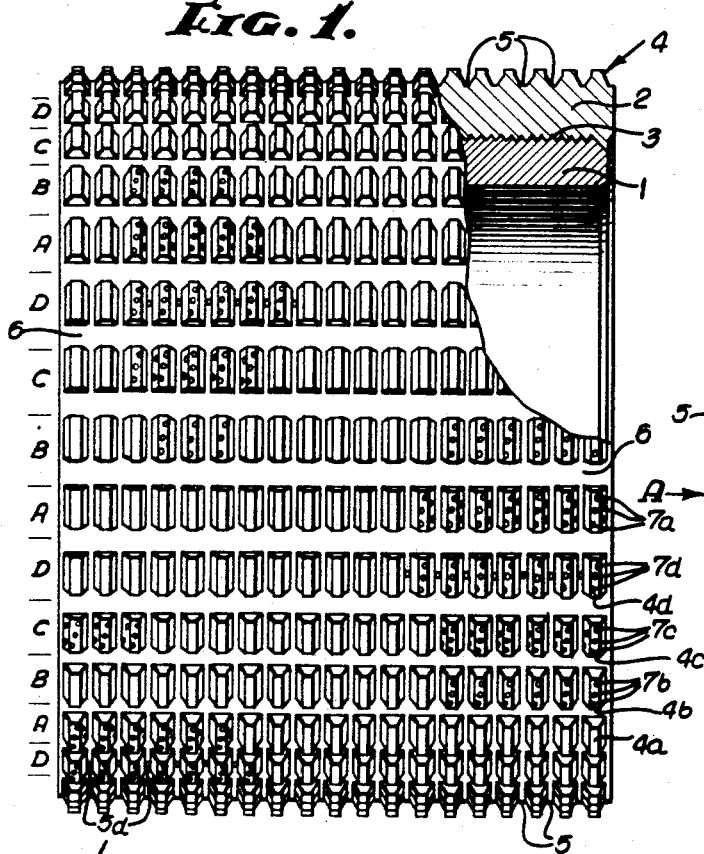
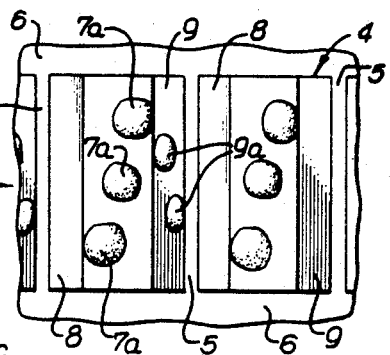
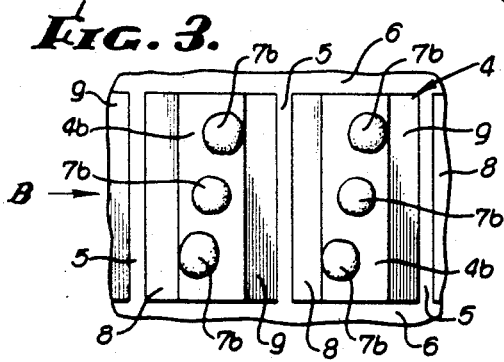
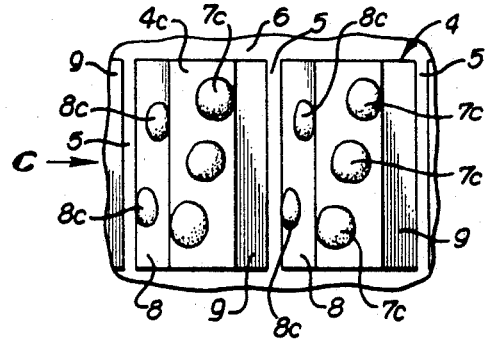
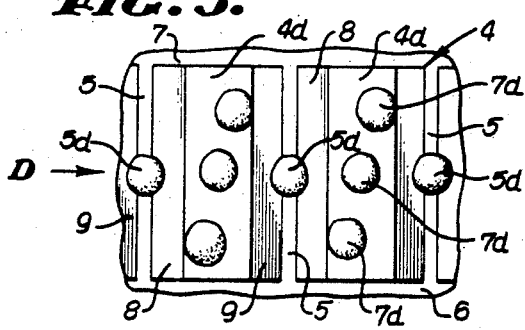
INVENTOR.
BENJAMIN L. AUSTIN
By Bernard Kriegel
ATTORNEY.

Sept. 23, 1969  B. L. AUSTIN  3,468,583
DIAMOND MILLING CUTTERS
Filed June 30, 1967  2 Sheets-Sheet 2

INVENTOR
BENJAMIN L. AUSTIN
By Bernard Kriegel
ATTORNEYS.

United States Patent Office 3,468,583
Patented Sept. 23, 1969

3,468,583
DIAMOND MILLING CUTTERS
Benjamin L. Austin, Murray, Utah, assignor to Christensen Diamond Products Company, Salt Lake City, Utah, a corporation of Utah
Filed June 30, 1967, Ser. No. 650,367
Int. Cl. E21c *13/00;* B24d *3/00;* E21b *9/36*
U.S. Cl. 299—89                                    22 Claims

ABSTRACT OF THE DISCLOSURE

A diamond milling cutter of generally cylindrical form having axially spaced parallel ridges and grooves on and in which diamonds are arranged to form parallel ridges in the surface of a highway, airstrip, or the like, said surface ridges enhancing traction.

---

The present invention relates to diamond milling cutters, and more particularly to diamond milling cutters which are useful in the formation of the desired and improved surface on vehicle supporting highways, airstrips, and the like, whereby to enhance vehicle traction.

The present invention is an improvement in milling cutters of the type disclosed and claimed in U.S. Patent No. 3,306,669, granted Feb. 28, 1967.

Diamond milling cutters have been employed heretofore, which produce the same surface profile in concrete runways or highways as would be attained from a series of saw blades mounted on an arbor. Such diamond milling cutters have been found to be very efficient and durable, but yet subject to a limited life, in part due to the inability of the cooling or flushing fluid employed during the milling operation to flush cuttings from the milling cutter and the region being cut. In addition, certain of the diamond milling cutters have, due to their structure, necessitated the reduction of the concrete material to very fine cuttings, with the inherent result that much time is consumed in the milling operation.

Accordingly, the present invention has as an object the provision of a diamond milling cutter which is so constructed that, not only will the milling cutter produce cuttings of comparatively large size, but also the flow of flushing fluid is facilitated so as to more effectively cool the milling cutter and remove cuttings as the cutter progresses along the concrete highway or aircraft runway, or the like.

Another object of the invention is to provide a diamond milling cutter of the type comprising axially spaced ridges and grooves extended in parallel relation about a generally cylindrical cutter body, and wherein diamond cutting elements are so located on and between the ridges as to impose lateral forces on the ribs being formed by the cutter, whereby to break off the crests of the ridges formed in the concrete surface.

Still another object of the invention is to provide a diamond milling cutter of the type having a plurality of parallel axially spaced ribs and grooves disposed about a generally cylindrical body, and wherein the ribs are provided with diamonds thereon and therebetween, which diamonds are so arranged as to cause high frequency, alternate or reversing lateral forces to be imposed on the concrete ribs being formed by the cutter, as the milling cutter is caused to rotate relative to the work and moves longitudinally thereon, so as to break off the crests of the ridges being formed by the cutter.

A further object of the invention is to provide a diamond milling cutter having a plurality of axially spaced ribs and grooves disposed about a generally cylindrical body, the ribs being provided with diamonds thereon and therebetween, and the ribs being circumferentially discontinuous so as to form waterways or flow passages for cooling and flushing fluid, so as to more effectively cool the milling cutter and remove cuttings therefrom during use.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a view in elevation showing a diamond milling cutter made in accordance with the invention, with a portion thereof broken away and shown in section;

FIG. 2 is an enlarged fragmentary detailed view illustrating the arrangement of diamonds on certain of the milling cutter ridge sections of the cutter of FIG. 1;

FIG. 3 is a fragmentary detailed view, on an enlarged scale, showing the arrangement of diamonds on another group of cutter ridge sections;

FIG. 4 is a fragmentary detailed view, on an enlarged scale, showing the arrangement of diamonds on another group of cutter ridge sections;

FIG. 5 is a fragmentary detailed view, on an enlarged scale, showing the arrangement of diamonds on another group of cutter ridge sections;

Figure 6:
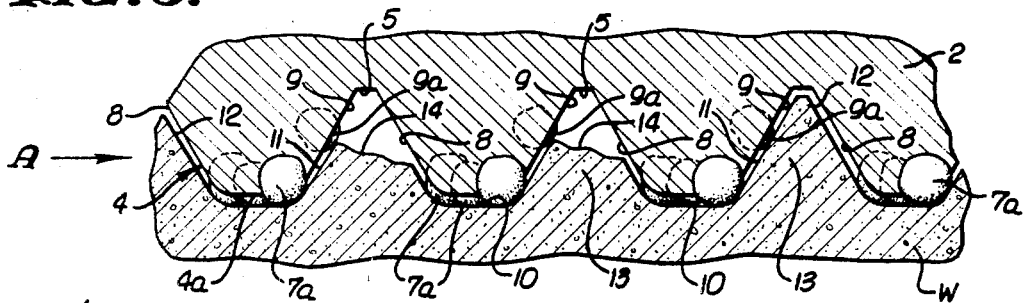
FIG. 6 is a fragmentary view in section showing the operation of the cutter ridge sections of FIG. 2 on the concrete work.
Figure 7:
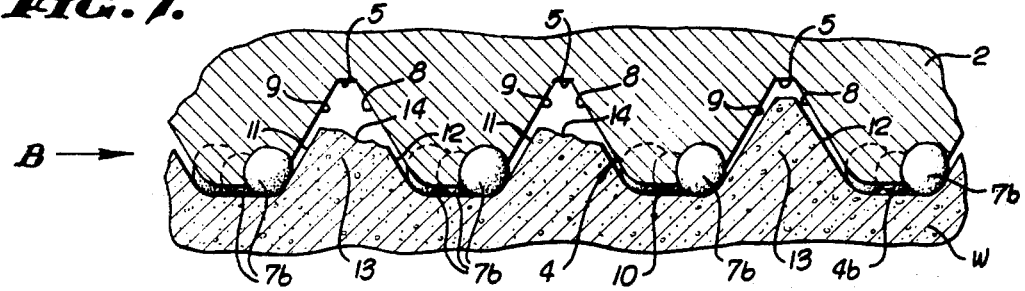
FIG. 7 is a fragmentary view in section showing the operation of the cutter ridge sections of FIG. 3 on the concrete work.

As disclosed in the drawings, the milling cutter hereof comprises a hub 1, preferably composed of steel, and on which is molded a generally cylindrical matrix body 2, the matrix body being interlocked with the hub 1, as by means of ribs and grooves, as indicated at 3. As is well known in the art, the hub 1 is adapted to be mounted upon a spindle or shaft, which will be suitably mounted on and rotated by a machine as the machine proceeds along a highway or aircraft landing strip, or other vehicle supporting surface. It is also known that a plurality of the milling cutters may be disposed in end-to-end relation along the spindle or shaft for simultaneous operation upon a substantial width of the concrete surface.

According to the present invention, the matrix body 2 is provided with alternate ridges 4 separated by grooves 5 and disposed in parallel relation about the axis of the milling cutter body in planes normal to the body axis. In the illustrative embodiment, the ribs 4 are discontinuous circumferentially in the sense that they are interrupted by a plurality of longitudinal channels or waterways 6 extending from end to end of the milling cutter, and communicating with the circumferential grooves 5 to allow for the flow of cooling and flushing fluid. Thus, in the specifically illustrated embodiment, the milling cutter is so formed by the provision of the intersecting grooves 5 and waterways 6 that the ridges 4, in effect, are formed by a series of circumferentially spaced ridge sections, the ridge sections of adjacent ridges being aligned longitudinally of the cutter in rows which are repetitively denoted in FIG. 1 by the letters A, B, C, D. Representative ridge sections of a row A are shown in FIG. 2; while representative ridge sections of rows B, C and D are shown in FIGS. 3, 4 and 5, respectively, to which detail reference will now be made in respect of the specific form of the ridge sections and the placement of diamond cutting elements thereon and therebetween.

As is customary in the manufacture of diamond milling cutters of the type here involved, the matrix 2, which is composed of powdered metal, and which may include tungsten carbide, cast on the hub 1 is provided with cutting elements embedded therein and arranged in a pattern so as to effectively perform a cutting action as the milling cutter is caused to revolve and is moved or bodily translated along the concrete surface. In the case of the present invention, the respective ridge sections are provided with diamonds respectively designated 7a, 7b, 7c and 7d, which are arranged in the mold for the matrix so as to be located on the crests of the ridge sections, said crests being designated 4a through 4d in FIGS. 2 through 5. In the specifically illustrated embodiment, each of the ridge sections 4 has the width portion of its crest 4a through 4d disposed axially of the milling cutter, the diamonds 7a through 7d being arranged in spaced relation both circumferentially of the milling cutter and axially thereof, so as to span the ridge crests and be exposed to the concrete across substantially the entire crest width of the respective ridge sections.

Each of the ridge sections 4 is provided with flanks or side walls respectively designated 8 and 9, these side walls defining the grooves 5 between adjacent ridge sections. The side walls 8 and 9 of the ridge sections diverge from the ridge crests toward the base thereof.

Each of the rows of ridge sections A, in the flank or side wall 9 thereof, is provided with diamonds 9a so disposed on the wall as to cut a side wall of angular or tapered form on a ridge or rib produced in the concrete work. It should be noted, however, that the opposing wall 8 of the ridge sections of each row A is left plain, that is, devoid of diamond cutting elements, all as seen in FIG. 2. Referring to FIG. 4, it will be noted that each of the ridge sections of the cutter in the rows C is provided with diamond cutting elements 8c in its flank 8 for cutting the other angular side wall of a ridge in the concrete work, while the flank or side walls 9 of the ridge sections in each of the rows C is left plain, without diamonds therein.

Referring to FIG. 5, it will be noted that, in each of the rows D, the base of the groove 5 defined between adjacent ridge sections has a diamond cutting element 10d which is adapted to cut the upper or outer edge of a ridge in the concrete work, if such edge remains during progression of the milling operation. Row B (FIG. 3) has diamond cutting elements 7b disposed only in the crest portions of the ridges.

From the foregoing, it will now be apparent that all of the ridge sections in the illustrative embodiment are provided with diamonds respectively designated 7a through 7d which progressively engage the concrete work as the cutter is rotated and moved longitudinally of the work, so as to lead into the concrete work, as is best illustrated in FIGS. 6 through 9.

Figure 8:
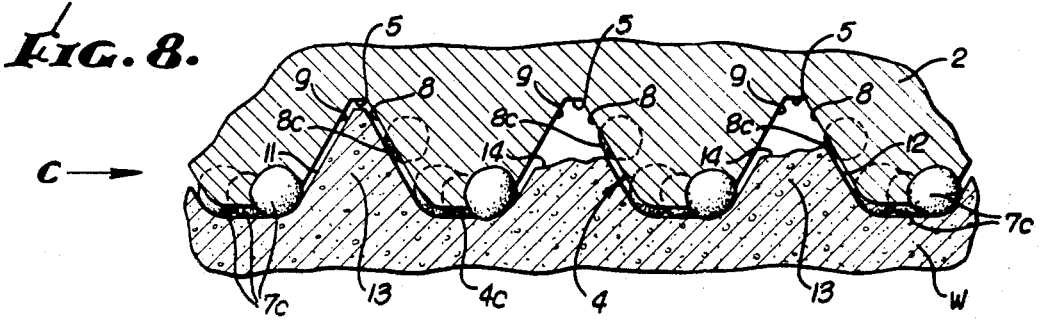
FIG. 8 is a fragmentary view in section showing the operation of the cutter ridge sections of FIG. 4 on the concrete work.
Figure 9:
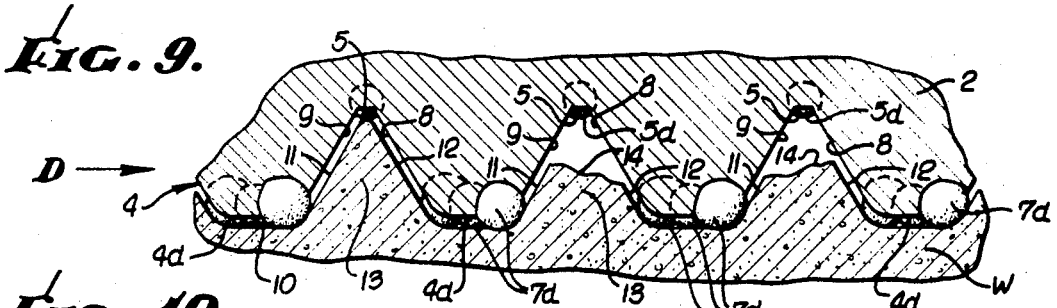
FIG. 9 is a fragmentary view in section showing the operation of the cutter ridge sections of FIG. 5 on the concrete work.

The function of the flank mounted cutting diamonds 9a and 8c is illustrated in FIGS. 6 and 8, wherein it will be noted that, as the milling cutter rotates and proceeds longitudinally of the concrete work W, and the diamonds 7a through 7d lead into the concrete work to form the bottom wall 10 of a longitudinally extended groove in the work, the flank mounted diamonds 9a and 8c will form the outwardly convergent side walls 11 and 12, respectively, of the concrete ridges 13.

Figure 10:
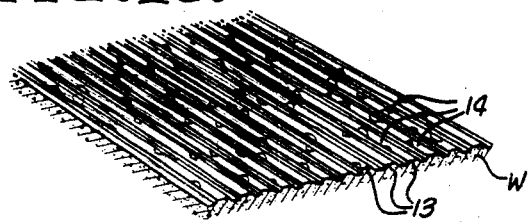
FIG. 10 is a fragmentary view illustrating the resultant ridged and grooved surface of a section of concrete provided by the use of the milling cutter of FIGS. 1 through 9.

Inasmuch as the rows of ridge sections A through D are successively presented to the work, it will be apparent that there will be imposed on the concrete ridges 13 by the diamonds 9a a lateral force in a right-hand direction, as viewed in FIG. 6, while there will be imposed on the concrete ridges 13 by the diamonds 8c a lateral force in a left-hand direction, as viewed in FIG. 8, these lateral forces being alternately applied and at a frequency determined by the rate of rotation of the cutter body, which may be revolving at a desired number of revolutions per minute. When the cutting elements 9a in a flank 9 engage the surface 11 of a ridge 13, the opposite face 12 of the ridge is unsupported because of the absence of diamonds in the opposed flank 8, and the cutting elements 9a impose the lateral force described above. A similar lateral force in the opposite direction is imposed when the diamond cutting elements 8c engage the face 12 of the ridge, the opposite face 11 being unsupported, as shown in FIG. 8. Thus, there will be imposed on the concrete ridges 13 alternate lateral forces at high frequency, which cause the fracture or breaking off of the crests of the concrete ribs 13, whereby the resultant outer face 14 of the concrete ribs 13 will be of irregular contour, inasmuch as such face will not be a milled face, but, instead, will be the result of breaking away of the aggregate material by the application of the above-described reverse acting lateral forces. In any event, however, there is provided in the rows of ridge sections D of the milling cutter the diamonds 5d which, if a ridge crest in the work W has not been broken off, will engage the same and cause cutting thereof so that under no circumstances will any portion of a concrete ridge extend above the plane of the diamonds 5d. The resultant concrete surface engageable by the wheels of automotive vehicles or aircraft, or the like, is illustrated in FIG. 10, wherein it will be noted that the broken crest faces 14 of the ridges 13 are of non-uniform and rough configuration, so as to substantially enhance the traction of wheels of vehicles rolling thereon. In addition, the breaking off of the crest portions of the concrete ridges results in such ridges being of stub form, better able to withstand vehicle or aircraft loads, with the result of providing a much longer useful life.

It will also be noted that due to the fact that diamonds are disposed in only certain of the flank walls of the ridge sections, abundant clearance space is provided through which flushing and cooling fluid may flow to assist in removing cuttings and cooling the cutting elements, such cooling fluid, as previously indicated, finding access to the cutting areas through the waterways 6.

I claim:
1. In a milling cutter including a generally cylindrical body adapted to be rotated about an axis, said body comprising axially spaced circumferential ridges extending around its periphery and disposed normal to the body axis, said body having circumferential grooves between said ridges, and diamond cutting elements embedded in said ridges to form complemental ridges and grooves in a workpiece engaged by said diamond cutting elements, the improvement wherein said body ridges have flanks diverging from the crests of said ridges toward the bases thereof, individual diamond cutting elements being embedded in said flanks in a predetermined pattern in spaced circumferential relation to each other.

2. A milling cutter as defined in claim 1, wherein said body is a unitary structure, including waterways extending longitudinally thereof and communicating with said grooves, and said ridges comprise circumferentially spaced ridge sections arranged in rows between said waterways.

3. In a milling cutter including a generally cylindrical body adapted to be rotated about an axis, said body comprising axially spaced circumferential ridges extending around its periphery and disposed normal to the body axis, said body having circumferential grooves between said ridges, and diamond cutting elements embedded in said ridges to form complemental ridges and grooves in a workpiece engaged by said diamond cutting elements, the improvement wherein said body ridges have flanks diverging from the crest of said ridges toward the base thereof, diamond cutting elements being embedded in said flanks in spaced relation to each other, wherein said diamond cutting elements comprise diamonds in the crest of said ridges and diamonds in the flanks of said ridges, said diamonds in the flanks of said ridges being alternately located in the opposite flanks of said ridges in circumferentially spaced relation about said cutter body.

4. In a milling cutter including a generally cylindrical body adapted to be rotated about an axis, said body comprising axially spaced circumferential ridges extending around its periphery and disposed normal to the body axis, said body having circumferential grooves between said ridges, and diamond cutting elements embedded in said ridges to form complemental ridges and grooves in a workpiece engaged by said diamond cutting elements, the improvement wherein said body ridges have flanks diverging from the crest of said ridges toward the base thereof, diamond cutting elements being embedded in said flanks in spaced relation to each other, wherein said body includes waterways extending longitudinally thereof and communicating with said grooves, and said ridges comprise circumferentially spaced ridge sections arranged in rows between said waterways, certain of said rows of ridge sections having diamond cutting elements in one flank thereof and certain other of said rows of ridge sections having diamond cutting elements in the other flank thereof.

5. A milling cutter as defined in claim 4, wherein certain other of said rows of ridges have diamond cutting elements disposed in the grooves between said ridges.

6. In a milling cutter: a unitary body adapted to be rotated about an axis, said body comprising a plurality of axially extended rows of ridge sections, said rows of ridge sections including a first row having diamond cutting elements in the ridge crest and diamond cutting elements in one flank only of each ridge section of said first row, and a second row of bridge sections having diamond cutting elements in the other flank only of each of its ridge sections.

7. In a milling cutter: a body adapted to be rotated about an axis, said body having axially spaced circumferentially extended ridges disposed on planes normal to the body axis and having flanks forming grooves between said ridges, and cutting elements disposed on said ridges and between said ridges, said cutting elements between said ridges including cutting elements disposed on one of said flanks in a first longitudinally extended zone of said ridges and on the other of said flanks in a second longitudinally extended zone of said ridges, said second zone being angularly spaced about said body from said first zone.

8. A milling cutter as defined in claim 7, wherein said cutting elements comprise diamonds.

9. A milling cutter as defined in claim 7, wherein said body is a generally cylindrical body of matrix material, and said cutting elements comprise diamonds embedded in said matrix material.

10. A milling cutter as defined in claim 7, wherein said body also includes longitudinally extended waterways traversing said grooves and dividing said ridges into ridge sections spaced from each other circumferentially of said body.

11. A milling cutter as defined in claim 7, wherein said ridges have a longitudinally extended crest provided with certain of said cutting elements spanning said crest, and said flanks diverge from said crest toward the base of said ridges.

12. A milling cutter as defined in claim 7, wherein said body is a generally cylindrical body of matrix material, said cutting elements comprise diamonds embedded in said matrix material, and said cutting elements disposed in said flanks span said flanks.

13. A milling cutter as defined in claim 7, wherein said cutting elements include cutting elements at the crest only of said ridges in a third longitudinally extended zone of said ridges spaced angularly from said first and second longitudinally extended zones.

14. A milling cutter as defined in claim 7, wherein said cutting elements include cutting elements at the crest of said ridges and in the base of said grooves at a third longitudinally extended zone of said ridges spaced angularly from said first and second longitudinally extended zones.

15. In a milling cutter: a unitary cylindrical body adapted to be rotated about an axis, said body comprising sets of circumferentially extended ridge sections extended in longitudinal rows in angularly spaced relation about said body and defining grooves between said ridge sections, said ridge sections having flanks diverging from the crests of said ridge sections toward the bases thereof, and individual cutting elements embedded in said flanks and crests in a predetermined pattern in spaced circumferential relation to each other.

16. In a milling cutter: a body adapted to be rotated about an axis, said body comprising sets of circumferentially extended ridge sections extended in longitudinal rows in angularly spaced relation about said body and defining grooves between said ridge sections, and cutting elements on said ridge sections for cutting grooves in a workpiece, wherein said sets of rows of ridge sections each include one row of ridge sections having cutting elements on one flank of the ridge sections, and another row of ridge sections having cutting elements on the other flank of the ridge sections.

17. In a milling cutter: a body adapted to be rotated about an axis, said body comprising sets of circumferentially extended ridge sections extended in longitudinal rows in angularly spaced relation about said body and defining grooves between said ridge sections, and cutting elements on said ridge sections for cutting grooves in a workpiece, wherein said sets of rows of ridge sections comprise a first row of ridge sections having cutting elements on one flank only of said ridge sections, a second row of ridge sections having cutting elements on the crests only of said ridge sections, and a third row of ridge sections having cutting elements on the other flank only of said ridge sections.

18. A milling cutter as defined in claim 17, wherein said body is a generally cylindrical member of matrix material, and said cutting elements comprise diamonds embedded in said matrix material.

19. A milling cutter as defined in claim 17, wherein a fourth row of ridge sections has cutting elements in the base of said grooves between said ridge sections.

20. A milling cutter as defined in claim 19, wherein said body is a generally cylindrical member of matrix material, and said cutting elements comprise diamonds embedded in said matrix material.

21. A milling cutter as defined in claim 17, wherein said first and third rows of ridge sections also include cutting elements on the crests of said ridge sections.

22. A milling cutter as defined in claim 21, wherein said body is a generally cylindrical member of matrix material, and said cutting elements comprise diamonds embedded in said matrix material.

References Cited

UNITED STATES PATENTS

| 2,662,738 | 12/1953 | Davis et al. | 175—330 |
|---|---|---|---|
| 3,288,580 | 11/1966 | Curn | 51—206 X |
| 3,306,669 | 2/1967 | Christensen et al. | 299—40 X |
| 3,376,673 | 4/1968 | Metzger et al. | 51—206.4 X |

ERNEST R. PURSER, Primary Examiner

U.S. Cl. X.R.

51—206; 125—39; 175—329